United States Patent [19]

Chen

[11] Patent Number: 5,828,365
[45] Date of Patent: Oct. 27, 1998

[54] ELECTRIC FIELD-INDUCED CORDLESS MOUSE DEVICE

[76] Inventor: Yao-kuo Chen, No. 19, Lane 28, Yuhsi St., Yungho City, Taipei Hsien, Taiwan

[21] Appl. No.: 758,553

[22] Filed: Nov. 29, 1996

[51] Int. Cl.⁶ .................................................. G09G 5/08
[52] U.S. Cl. ............................................ 345/163; 345/173
[58] Field of Search .................................... 345/156, 157, 345/163, 164, 167, 173; 178/18, 19

[56] References Cited

U.S. PATENT DOCUMENTS 4,564,835  1/1986  Dhawan .................................. 345/163

*Primary Examiner*—Matthew Luu
*Attorney, Agent, or Firm*—A & J

[57] ABSTRACT

An electric field-induced cordless mouse device with convenient operation is disclosed. The mouse device includes a cordless mouse, a mousepad and a housing. The mouse has a double-head trigger circuit connected to an output of a conventional interior circuit therein for converting a square-wave signal into a pulse signal. The interior circuit and the double-head trigger circuit are connected to a common power supply, and in a preferred embodiment, to a rechargeable battery. A connection point and a plurality of pulse transmitting electrodes are formed on an undersurface of the mouse. The electrodes are connected to the double-head trigger circuit for outputting signals. The mousepad is formed of a flexible pad, a metal sheet and an insulating pad. The metal sheet is made of a metal foil and connected to an RS-232 interface circuit in a computer via a demodulating circuit provided for converting a pulse signal to a square-wave signal. The housing is connected to the RS-232 interface circuit via a two-way signaling cord. The housing has a mouse accommodating portion, a charging circuit therein for charging the battery of the mouse and a plurality of conducting strips contacting the connection point of the mouse for detecting the setup program.

6 Claims, 5 Drawing Sheets

ELECTRIC FIELD-INDUCED CORDLESS MOUSE DEVICE

BACKGROUND OF THE INVENTION

1. Field of the Invention

The present invention relates to a cordless mouse device used for a computer, and more particularly to an electric field-induced cordless mouse device used for convenient operation with a computer.

2. Description of Related Art

Mouse devices are used with computers as a peripheral tools for selecting coordinates. A kind of conventional mouse device is shown in FIG. 4 and FIG. 5. A mouse 60 is connected to an RS-232 interface circuit 61 of a computer 62 by a wire 63. Data input to the computer 62 by the mouse 60 is accomplished by the RS-232 interface circuit 61 inputting the square-wave signals from the mouse 60 into the computer 61. Since the wire 63 is a necessary element, the mouse 60 is limited in its operation area. To solve above problems, a kind of radio-controlling (R/C) mouse device was developed. The R/C mouse device still has a disadvantage that it consumes a great deal of electricity. This not only results in frequent replacement of batteries, but also fluctuations in a transmitting distance due to a weakening battery. Further disadvantages are the radio signals will occupy the communication channels and manufacture of the R/C mouse needs a costly production equipment. Another kind of mouse device is an infrared mouse, which provides an infrared transmitting circuit in a mouse and an infrared receiving circuit in the computer. Though this kind of mouse device overcomes the above-mentioned drawbacks, it still has a disadvantage that the transmitting and receiving of the infrared light are limited in a straight line direction and cannot penetrate not permitted at a barrier. This also restricts the operation area of the mouse.

The present invention provides an electric field-induced cordless mouse device to mitigate and/or obviate the aforementioned problems.

SUMMARY OF THE INVENTION

One object of the present invention is to provide an electric field-induced cordless mouse device which is convenient for operating.

In accordance with one aspect of the present invention, the electric field-induced cordless device includes a cordless mouse, a mousepad, and a housing. The mouse therein has an interior circuit, a double-head trigger circuit connected to an output of the interior circuit for converting a square-wave into a pulse, and an undersurface thereof has a connection point, and a plurality of pulse transmitting electrodes connected to the double-head trigger circuit for outputting signals. The mousepad has a metal sheet and an insulating pad covering the metal sheet. The metal sheet being connected to an RS-232 interface circuit in a computer via a demodulating circuit provided for converting a pulse into a square-wave. The housing is connected to the RS-232 interface circuit via a two-way signaling cord. The housing has a mouse accommodating portion and a plurality of conducting strips contacting the connection point of the mouse for detecting the setup program.

In accordance with another aspect of the present invention, the interior circuit and the double-head trigger circuit are connected to a common power supply.

In accordance with a further aspect of the present invention, the mousepad further has a flexible pad disposed under the metal sheet for providing a protection.

In accordance with still a further aspect of the present invention, the mouse further has a rechargeable battery therein and the housing further has a charging circuit for charging the battery of the mouse.

Other objects, advantages and novel features of the invention will become more apparent from the following detailed description when taken in conjunction with the accompanying drawings.

DETAILED DESCRIPTION OF PREFERRED EMBODIMENT

Figure 1:
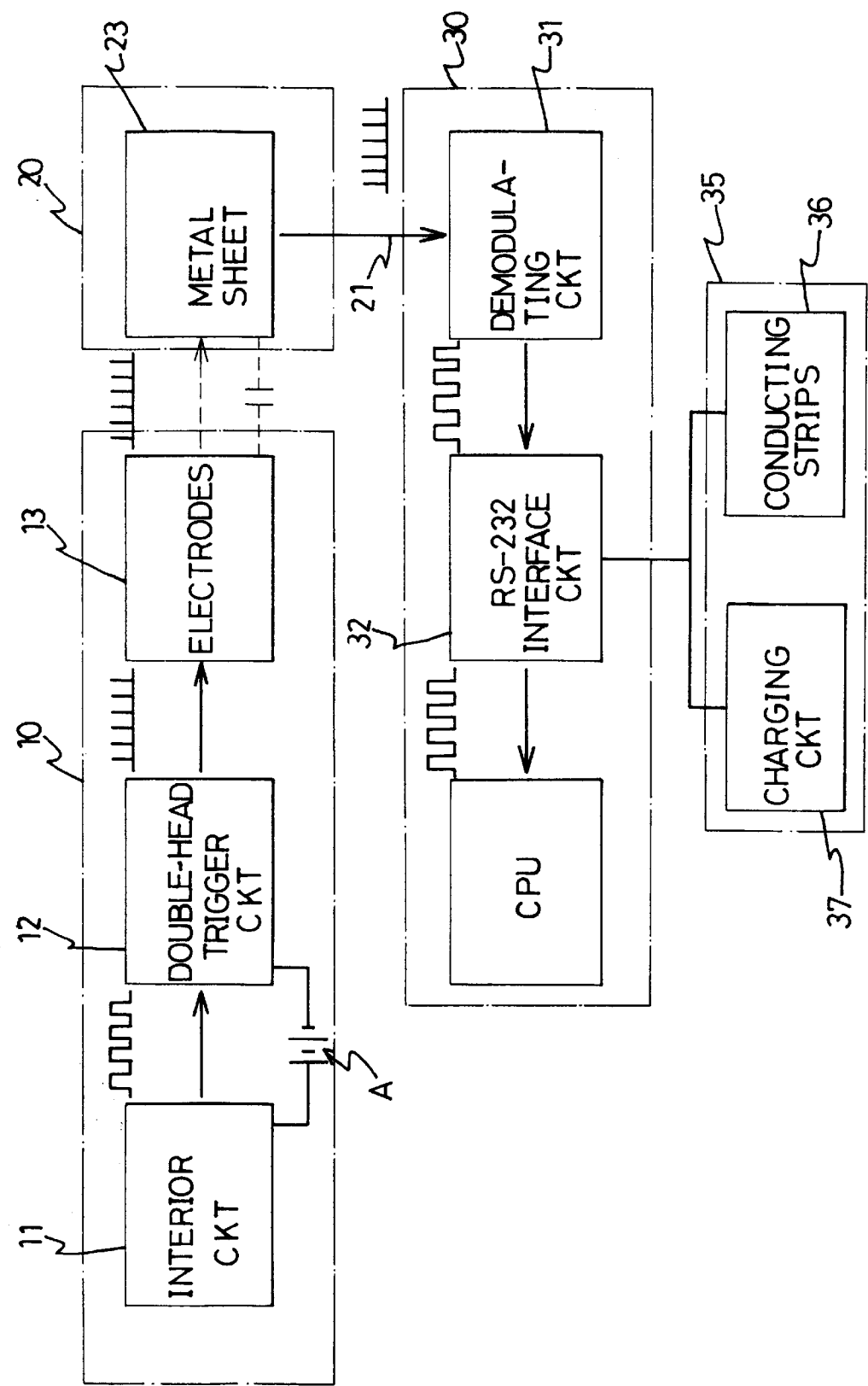
FIG. 1 is a block diagram showing the structure and the signal flow of an electric field-induced cordless mouse device in accordance with the present invention.
Figure 2:
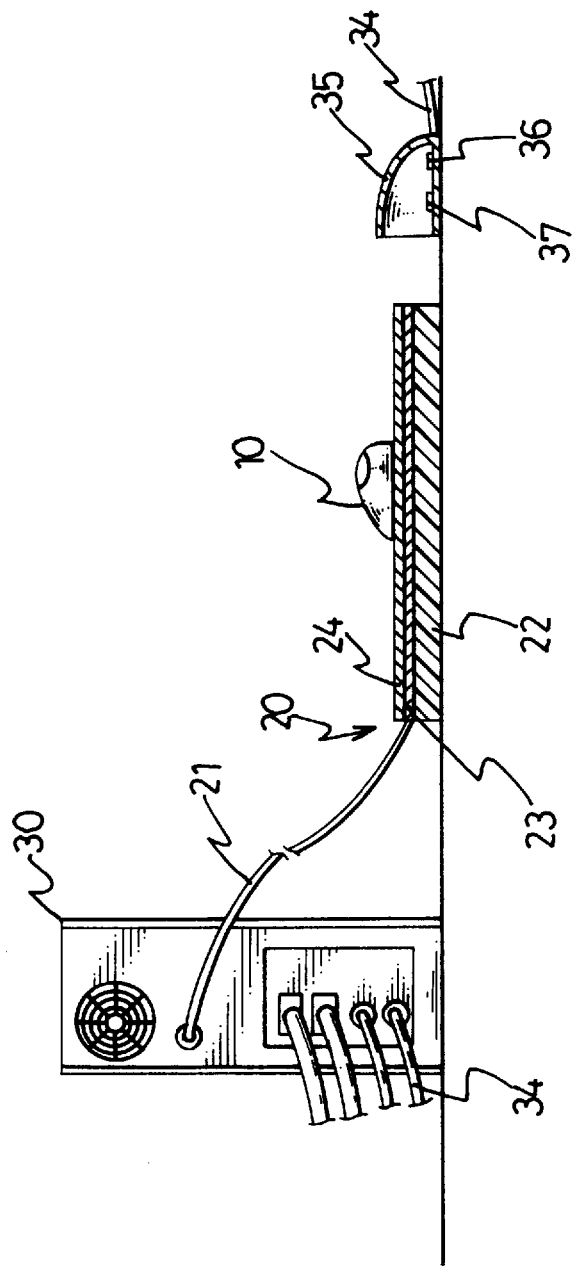
FIG. 2 is a schematic view showing the relationship between the electric field-induced cordless mouse device and a computer.
Figure 3:
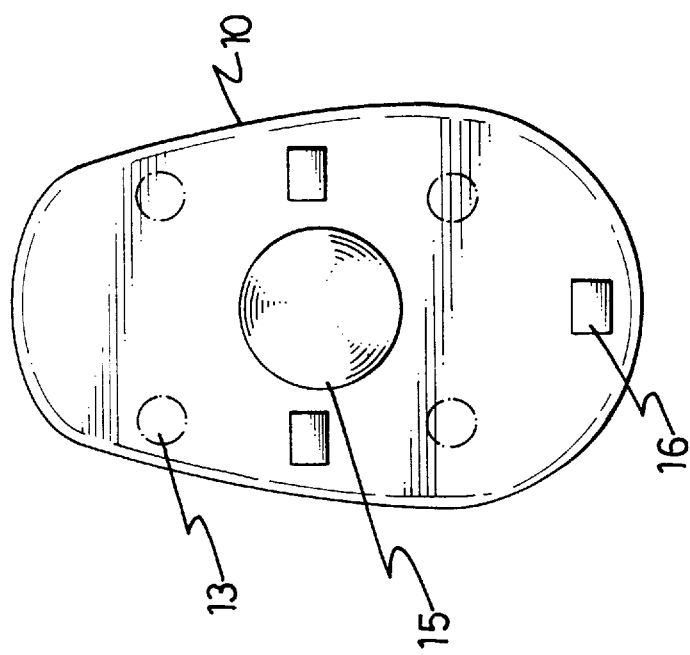
FIG. 3 is a bottom view showing the undersurface of a mouse of the electric field-induced cordless mouse device in accordance with the present invention.
Figure 4:
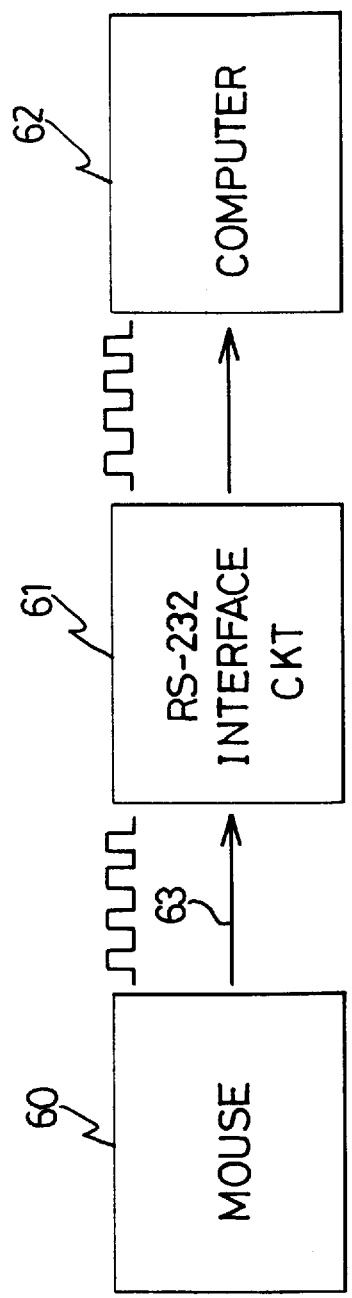
FIG. 4 is a block diagram showing a conventional circuit between a conventional mouse and a computer.
Figure 5:
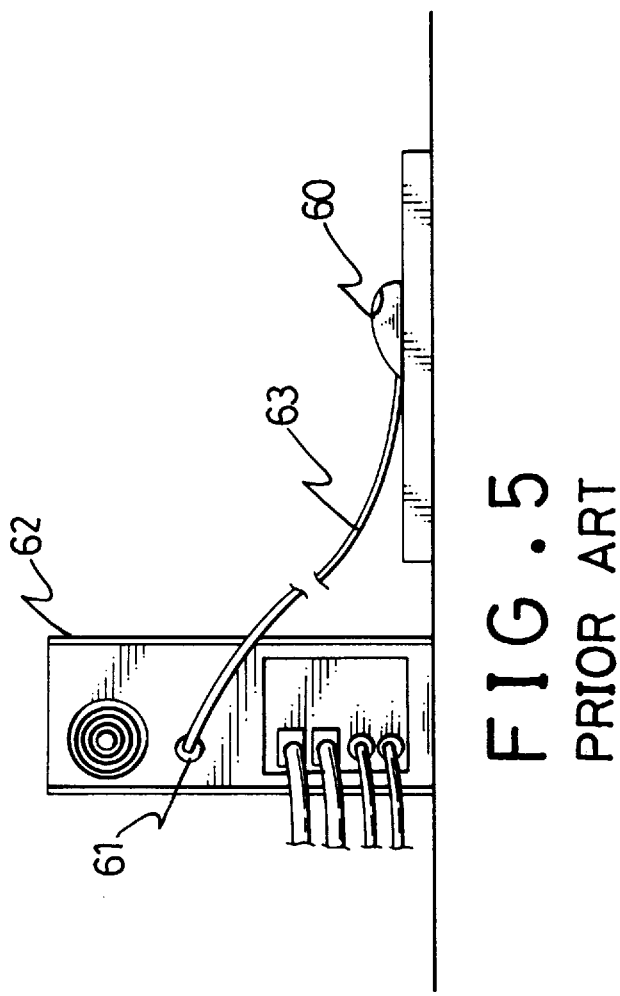
FIG. 5 is a perspective view showing a conventional mouse connected to a computer.

Referring to FIG. 1 and FIG.2, the electric field-induced cordless mouse device in accordance with the present invention includes a cordless mouse 10 and a mousepad 20. The cordless mouse 10 has an interior circuit 11 with the same construction as that of a conventional mouse. A double-head trigger circuit 12 is also disposed within the cordless mouse 10 and connected to an output of the interior circuit 11 for converting a square-wave signal from the interior circuit 11 into a pulse signal. The interior circuit 11 and the double-head trigger circuit 12 are connected to a common power supply A. With a reference to FIG. 3, the cordless mouse 10 further has on an undersurface thereof a ball 15, a connection point 16, and a plurality of pulse transmitting electrodes 13. The pulse transmitting electrodes 13 are connected to the double-head trigger circuit 12 for outputting signals from the trigger circuit 12. The pulse transmitting electrodes 13 may be formed in a full slice and function as a transmitting antenna.

Referring to FIG. 2, the mousepad 20 functions as a receiving antenna for receiving the pulse signals sent from the electrodes 13. The mousepad 20 is formed by a flexible pad 22 and a metal sheet 23 attached onto a top surface of the flexible pad 22. The metal sheet 23 is made of a metal foil and is connected to the computer 30 by means of a wire 21. An insulating pad 24 covers a top surface of the metal sheet 23 for preventing a short circuit resulted from direct contact of the pulse transmitting electrodes 13 and the metal sheet 23.

Still referring to FIG. 1 and FIG. 2, the computer 30 has a demodulating circuit 31 connected to the metal sheet 23 of the mousepad 20 via the wire 21 for restoring the pulse signals received by the metal sheet 23 into square-wave signals. Also in the computer 30, a conventional RS-232 interface circuit 32 is connected to an output of the demodulating circuit 31 for receiving the square-wave signals and inputting them to a CPU of the computer 30.

The RS-232 interface circuit 32 is further connected, via a two-way signaling cord 34, to a housing 35 with a mouse accommodating portion (not numbered). The housing 35 has a plurality of conducting strips 36 for contacting the connection point 16 of the mouse 10. When the computer 30 is powered up, the mouse 10 needs to be disposed within the mouse accommodating portion of the housing 35 for the computer 30 to detect the mouse setup program. The transmission of the detecting signal of the computer 30 and the response signal of the mouse 10 are accomplished by the conducting strips 36 and the connection point 16 of the mouse 10. The detecting procedure of the computer 30 is performed only once when the computer 30 is powered up. After the detecting procedure, the mouse 10 can be taken out of the housing 35 and placed on the mousepad 20 for operation.

To avoid the inconvenience of buying batteries, the power supply A of the cordless mouse 10 is provided by a rechargeable battery (not shown) disposed therein. As a result, a charging circuit 37 for charging the battery is arranged within the housing 35. The power of the charging circuit 37 is provided from the computer 30. For the purpose of increasing the convenience of use, the present invention provides two sets of rechargeable batteries, so that no time is wasted charging a battery.

In operation, when a user moves the ball 15 of the mouse 10, the selected coordinate of a destination will be converted into a square-wave signal by the interior circuit 11 and then converted into a pulse signal by the double-head trigger circuit 12. The pulse signal is then output by the pulse transmitting electrodes 13 and input to the mousepad 20 through the insulating pad 24 in a manner of capacity coupling. Then the metal sheet 23 induces the pulse signals from the electrodes 13 and outputs the pulses to the demodulating circuit 31 to restore them to square-wave signals. Then the square-wave signals are output to the CPU through the RS-232 interface circuit 32. Thereby, a cordless control of the mouse 10 is realized.

Accordingly, the present invention has the advantage of convenient operation. Since the mouse 10 is of cordless control nature, tangling and disengagement of a cord found in a conventional mouse does not occur. Also, the signals are transmitted from the mouse 10 to the attached mousepad 20, without any direction limit in the transmission. Furthermore, the present invention transmits signals in a low electric field and at a low frequency, therefore a high-frequency radio-signal will not be generated to interfere with other electrical devices.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. An electric field-induced cordless mouse device comprising:

a cordless mouse therein having an interior circuit, a double-head trigger circuit connected to an output of the interior circuit for converting a square-wave into a pulse, and an undersurface thereof having a connection point, a plurality of pulse transmitting electrodes connected to the double-head trigger circuit for outputting signals;

a mousepad having a metal sheet and an insulating pad covering the metal sheet, said metal sheet being connected to an RS-232 interface circuit in a computer via a demodulating circuit provided for converting a pulse into a square-wave;

a housing connected to the RS-232 interface circuit via a two-way signaling cord, said housing having a mouse accommodating portion and a plurality of conducting strips contacting the connection point of the mouse for detecting the setup program.

2. An electric field-induced cordless mouse device as claimed in claim 1, wherein said interior circuit and said double-head trigger circuit are connected to a common power supply.

3. An electric field-induced cordless mouse device as claimed in claim 1, wherein said pulse transmitting electrodes are formed on a full slice.

4. An electric field-induced cordless mouse device as claimed in claim 1, wherein said metal sheet of the mousepad is a metal foil.

5. An electric field-induced cordless mouse device as claimed in claim 1, wherein said mousepad further has a flexible pad disposed under the metal sheet for providing protection.

6. An electric field-induced cordless mouse device as claimed in claim 1, wherein said mouse further has a rechargeable battery therein and said housing further has a charging circuit for charging the battery of the mouse.

* * * * *